Jan. 12, 1971   R. G. NYE ET AL   3,555,498
SONAR PROCESSOR AND DISPLAY CIRCUITS
Filed Nov. 12, 1963   4 Sheets-Sheet 1
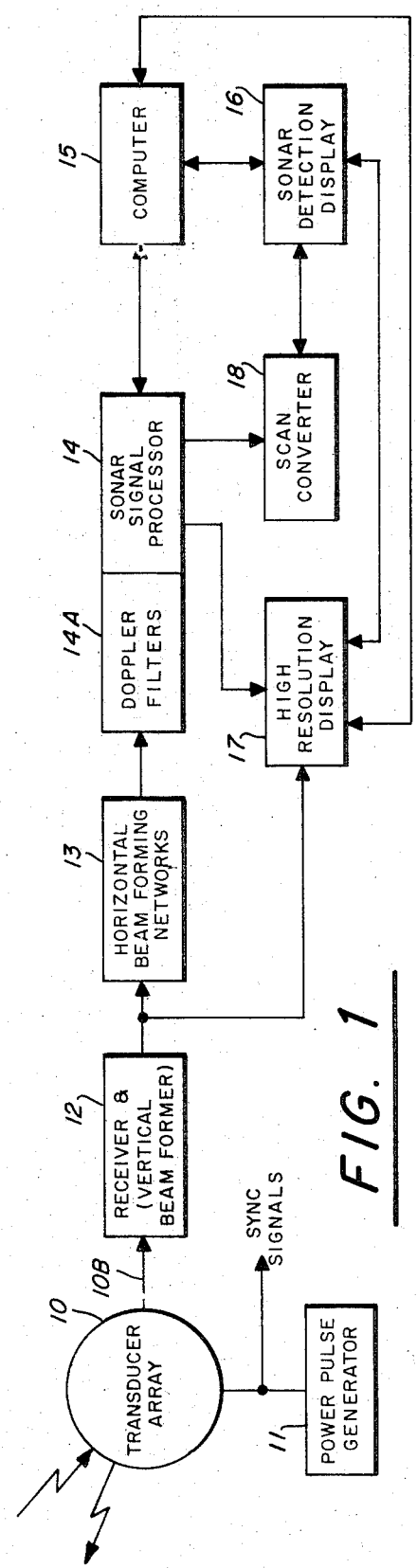
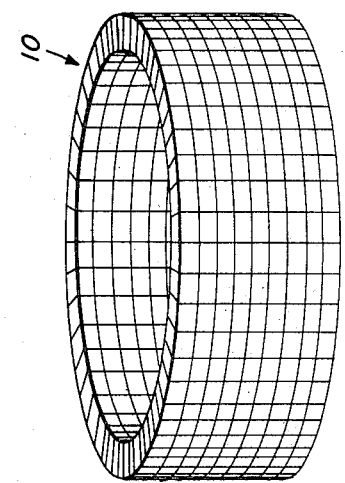
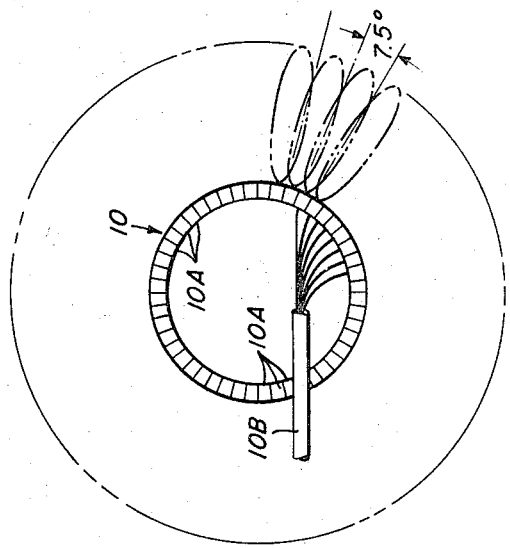
INVENTORS
ROBERT G. NYE
JOSEPH J. MARCIANO
WILLIAM E. KLUND
ROGER H. PRAGER
BY
ATTORNEYS

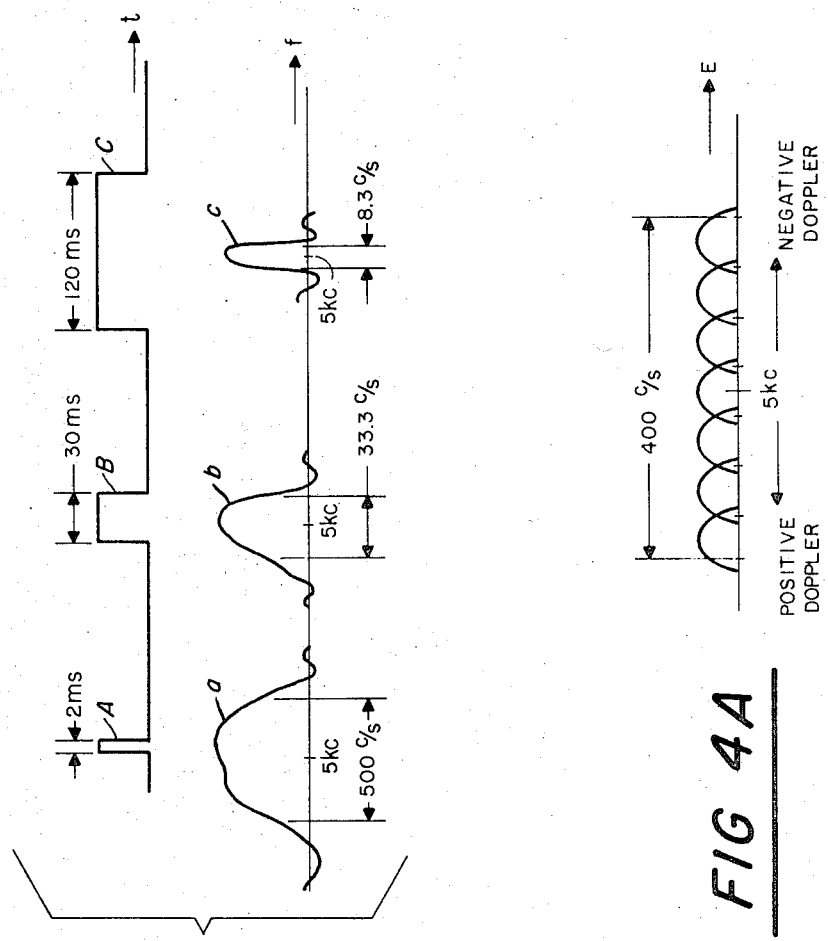

United States Patent Office 3,555,498
Patented Jan. 12, 1971

3,555,498
SONAR PROCESSOR AND DISPLAY CIRCUITS
Robert G. Nye, Joseph J. Marciano, William E. Klund, and Roger H. Prager, San Diego, Calif., assignors to the United States of America as represented by the Secretary of the Navy
Filed Nov. 12, 1963, Ser. No. 323,549
Int. Cl. G01s 9/68
U.S. Cl. 340—3  6 Claims The invention described herein may be manufactured and used by or for the Government of the United States of America for governmental purposes without the payment of any royalties thereon or therefor.

The invention relates to sonar systems and is particularly directed to means for processing and displaying signals received by underwater transducers.

The active type sonar is contemplated here, as distinguished from the passive type. In the active type, pulses of considerable power are applied to a submerged diaphragm to produce sound waves in the water. The rebound or echo waves from targets to the transducer produce the electrical signals of interest.

Because of the many sources of noise in a sonar system the operator at the oscilloscope display screen is taxed to distinguish among real and spurious or noise signals.

The principal object of this invention is to provide an improved processing and display of sonar echo signals.

The sonar system of this invention is a system which enables its operators to conduct a sonic search of the ocean volume surrounding his ship, to detect objects which reflect or radiate sonic energy, to determine the bearing, range and motion of detected objects, to accomplish classification of "contacts" and finally to transmit selected information to fire control systems or to higher command echelons. Existing sonar systems require an operator's direct attention to accomplish each of these tasks. He must observe the sonic returns from the bottom, from the surface, and from random sound wave scatterers, as well as those from possible real targets. He must recognize real target returns in a noisy background and must perform manual operations to determine range, bearing, and range rate of selected targets. Heretofore, to determine whether the target range is opening or closing, when real contacts are made with a target, the contacts must be visually tracked for some time. Only then can fire control information be given.

Such demands on the operator's time severely limit the number of contacts which he can keep under close surveillance. Moreover, they reduce his effectiveness in searching the sonic returns for targets near the limit of detectability. Improvements in submarine design such as greater submerged speeds, essentially unlimited periods of submergence, and increased depths impose even greater problems in search detection, classification, tracking, and destruction and materially reduce the time interval between detection and kill. Unfortunately, certain processes involved in antisubmarine problem solving are not sufficiently advanced technologically to permit a completely automatic operation. The partial automation of the detection process as exemplified by the system of this invention represents a considerable and significant advance in the state of the art of anti-submarine warfare.

Accordingly, a more specific object of this invention is to provide improved means for aiding the operator in selecting wanted signals from among many unwanted signals.

The objects of this invention are achieved, in a system which provides the following salient features. The particular transducer contemplated here comprises, specifically, an array of elements arranged in a circle and generally conforming structurally and functionally to the transducer disclosed in U.S. Pat. No. 3,177,382 issued April 6, 1965, and entitled "Mosaic Construction for Electroacoustical Cylindrical Transducers." Signals pass through phase shifting delay lines or matrices to provide maximum directionality and gain and the phase relationships of the signals from the elements may be so related as to provide 48 beams as narrow as 7.5° at the half power points. If desired, several rings of the transducers, each containing 48 elements, may be stacked to give directionality in the vertical plane and by vertically aligning the elements of adjacent rings, "staves" of a cylindrical or barrel-shaped array are provided. Signals of each stave may be combined in the proper phase relations to directionalize the beam and depress the beam from the horizontal. For the purposes of this disclosure only the 48 separate signals from the 48 circumferentially placed elements will be considered.

A computer programmed threshold device is employed to accept only those sonar signals which exceed an automatically adjusted minimum level. An overload control on the computer-programmed threshold insures a nearly constant number of display events at the search console. Digital data words then describe the amplitude, beam number, range, and Doppler frequency of all echo signals exceeding the programmed threshold. In one embodiment, a general purpose computer stores the above-threshold echoes from the last five sonar transmissions. Means is provided to correct the data words for the effects of pitch and roll motions of own ship. Human operators at two separate display consoles perform all detection decisions upon the sonar data gathered by the system throughout the search volume and examine selected portions of the search volume to classify signals from unidentified objects. The sonar detection display console (SSD) displays, repetitively in short time-compressed sequences, the returns from the lastest five sonar transmissions. This display is a range-versus-true bearing plot with the amplitude and Doppler character of the signals displayed symbolically. The bearing scale along the horizontal axis covers 360° of true bearing but the maximum range scale along the vertical axis is adjusted in several steps for ranges from, say, 1200 yards to 40,000 yards. All system operating controls as well as provision for entering target track detections and back-up classification of echoes are located on the sonar detection display console.

The classification and tracking are displayed at the high resolution display console (HRD), which provides an intensity modulated plot of echoes in a selected 15° bearing sector and in selected ranges. At this console, assignment of classification designations or symbols is made to target tracks and is accomplished when echo sequences have been identified. In addition, this console has means for updating track data to the general purpose computer and to the fire control system, not disclosed here. The necessary controls for transmission of track data to fire control are located on this console. Also, provision is made in the general purpose computer for automatic tracking of selected targets. The tracking function is performed on two targets simultaneously within the computer although only one track is displayed at a time on the high resolution display. The positional data required for the tracking function is supplied by the HRD operator by "hooking" the displayed target and entering up-dated bearing and range information into the computer. The HRD will normally provide accurate tracking data; however, the SDD can provide coarse tracking data when necessary.

Other objects and features of this invention will become apparent to those skilled in the art by referring to the specific embodiments described in the following specification and shown in the accompanying drawings in which:

FIG. 1 is a block diagram of the system of this invention which shows in general the flow of information through the system;

FIG. 2 shows in plan one transducer array which may be employed in the system of FIG. 1;

FIG. 3 shows in perspective another transducer array;

FIG. 4 shows the principal time and frequency functions of the sonar signals of this invention;

FIG. 4A shows graphs of the frequency spectra of uniformly, spaced Doppler signals.

Figure 5:
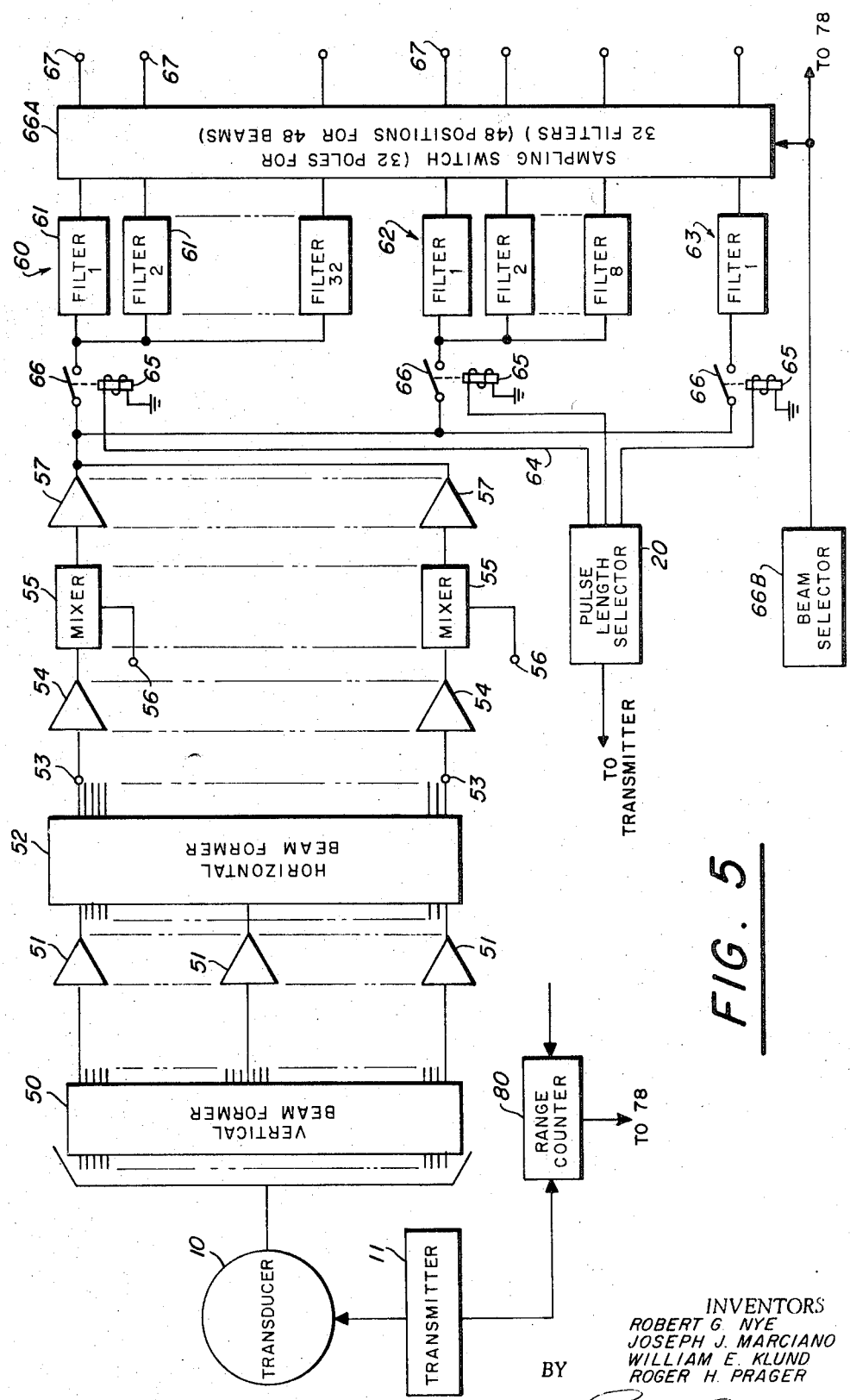
FIGS. 5 and 6, taken together, show in more detail the system outlined in FIG. 1, except for the computer and displays.

The underwater transducer of this system converts electrical echo ranging pulses to acoustic power in the water and, reciprocally, converts acoustic sounds in the water to electrical signals. Each transducer element, 10A, of an array 10, FIG. 2, comprises a block of magnetostrictive or electrostrictive material and is designed to be mechanically resonant at a center frequency of about 5 kilocycles per second. In one embodiment the elements are of ceramic material such as fired barium titanate. The entire transducer is free flooding and operates continuously submerged in salt water. In FIG. 2, 48 elements are arranged in a circle and may be disposed, submerged, in a horizontal plane. The array of FIG. 3 has been found effective in giving good directionality and gain in the vertical plane and, as shown, it consists of 9 rings of the transducer elements, so that if there are 48 elements per ring, there are a total of 432 elements in the array. By vertically aligning the element, 48 vertical "staves" with nine elements per stave result. The cable 10B, including a circuit from each transducer elements, leads into the carrying ship. These specific numbers are mentioned here in connection with transducer array 10 merely for the purpose of facilitating a description. It will be obvious to those skilled in the art that the number used are illustrative only and do not limit the generalities of this invention.

During transmission the electromechanical elements are energized by pulses of considerable power and the frequency of natural resonance of the elements, which in this example is 5 kc. The resulting effect causes the face of the element to reciprocate at 5 kc., and a sound wave is propagated in the water. During reception a sound wave in the water impinging upon the transducer face creates alternating pressures upon the elements at the frequency and intensity of the impinging sound wave. The alternating compression of the elements produces in the known manner electrical signals with the frequency and intensity of the impinging sound waves, these signals then passing into subsequent processing circuits.

During transmission, the phase relationships of the power pulses supplied to the elements in one ring may be so related as to substantially narrow the lobe of the radiation pattern in the horizontal plane, as shown in FIG. 2. This produces a relatively high intensity field within a narrow beam. Similarly, to produce narrow beams depressed from the horizontal, the array of FIG. 3 is employed and the phase of the signals to the elements in each stave are appropriately related. The phase relationships may be changed to depress the lobe 10, 20, 40 or more degrees with respect to the horizontal.

The phase relationship between the composite signals to and from the staves may be adjusted so as to narrow the horizontal beam width, as stated. Minor lobe responses can be made to be at least 20 db down from the major lobe peak response for each beam. Receiver 12 may employ 432 transducer-coupled circuits (FIG. 3) and the receiver may utilize mixers to combine the 432 signals in groups of 9 (stave groups) to produce 48 stave signals at the receiver output.

The 48 received stave signals are subjected to horizontal beam forming by the horizontal beam forming networks 13 of FIG. 1. Each of the 48 beam signals emerging from the horizontal beam forming networks 13 of FIG. 1 is subjected to filtering by a group of contiguous Doppler filters 14A. This information comprises range, Doppler shift, beam number (or azimuth information) and amplitude information for identifying unusual targets. Conveniently, the count of a counter employed for the successive switchings can be used to identify the number of the beam of any signal received. The computer sets an amplitude threshold that controls the acceptance of signals processed by the sonar signal processor. The computer also assigns a track number to each operator-selected event as well as feeds and controls data in and out of the sonar detection display 16 and high resolution display 17. The computer, further, coordinates the transfer of track information from the sonar detection display 16 to the high resolution display 17 as well as stores echo and track data while the display operators are processing the echoes from targets. The computer also integrates stored data with the data changes resulting from operator detection. The scan converter 18 stores signals produced by the signal processor (before or after thresholding) and provides a means of displaying analog information on the sonar detection display in the event of computer outage.

Because of the low frequencies employed underwater, the usual mechanically vibrated diaphragm can produce practically no directionality to the sound waves emitted from or received by the diaphragm. For this reason directionality can be obtained only by a transducer utilizing an array of elements. The particular array treated hereinafter is, as stated above, made of 48 cylindrically arranged transducer stores each facing outwardly in a direction 7.5° from the next adjacent transducer stave. By combining, in proper phase relation, 22 of the 48 transducer elements a horizontal beam 7.5° wide can be obtained, thus materially increasing the power gain of the array. If, now, the beam must be depressed to scan the ocean volume below the hull of the carrying ship, the 48 transducer staves must be arranged similarly but with their element signals combined in the proper phase relation to determine the depression angle. As stated, FIG. 3 shows one array with 48 staves and with 9 transducers per stave. For the purposes of this description, the depression angle will not be considered. Instead, the signals of the transducers of one stave are treated as a single sonar signal so that from the array shown there are 48 lines and 48 sonar signals.

Sonar pulses are produced at generator 11 by keying a 5 kc. source on and off and the repetition rate is selectively variable by an operator. The repetition is determined by the range selected by the SDD operator. This is a matter of selecting the area to be searched and is generally not related to the range of any specific target. The pulse duration is adjustable in steps from 2 milliseconds to 120 milliseconds. Pulses of different lengths have different spectral distributions. The short pulse has a wide frequency spectrum or wide bandwidth, whereas the long pulse has a very narrow bandwidth. For example, the short pulse A, FIG. 4, which is 2 milliseconds long has (at the half power points) being about 500 cycles per second. The long pulse C of 120 milliseconds, however, has a nominal bandwidth of only about 8.3 cycles per second, The medium pulse B of 30 milliseconds has a spectral distribution b— with a nominal bandwith of about 33.3 cycles per second. The short pulse with the broad spectrum is excellent in the sense that it provides good range resolution; i.e., it can detect small targets or minute echo highlights in the target. But, since the spectrum is broad, it is difficult to detect small changes in the received frequency, or doppler frequency shifts which are necessary for the estimation of target motion. The long pulse C, on the other hand, with the narrow bandwidth, is excellent for resolving Doppler shifts, but because of the long duration of the pulse it has poor range resolution. Pulse B with spectrum $b$ provides a compromise between these two conflicting requirements. Means are provided in the system for selectively transmitting pulses A, B or C.

Figure 6:
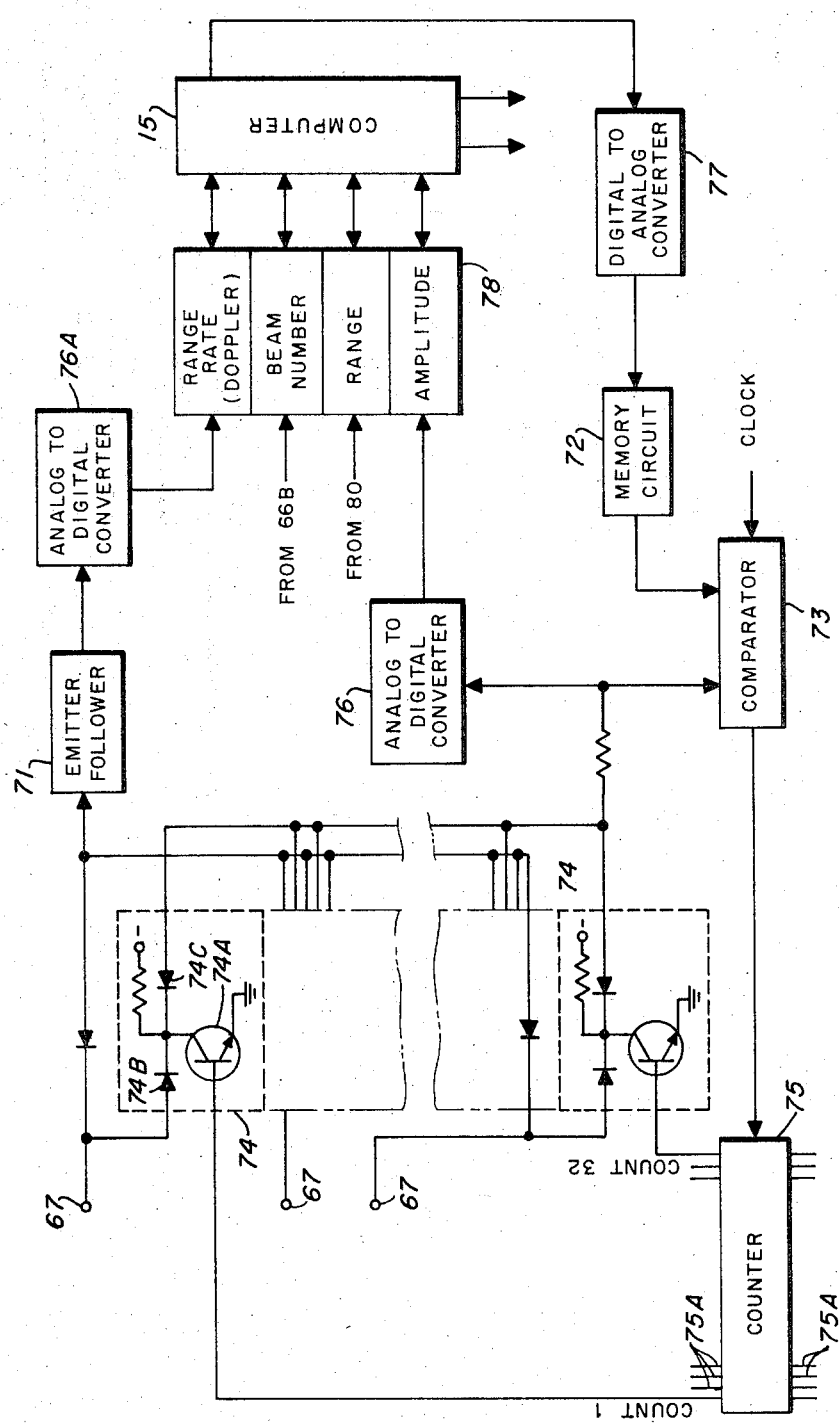

When FIGS. 5 and 6 are placed end to end, a block diagram of the transducer, the receiver and the sonar signal processor 14 of FIG. 1 may be seen. The transducer 10 of FIG. 5 is assumed to have 48 staves and hence to be capable of producing 48 beam signals. It is contemplated that each stave signal be derived by phase shift networks of delay lines shown as 50, for properly combining the signals of the elements of the stave. Each of the 48 derived signals are applied to preamplifiers 51.

By combining, in the proper phase relation, a plurality of the stave voltages, the beam patterns may be relatively narrow. With one array of 48 staves the maximum gain, or minimum beam width, was found to be derived by combining the signals from 22 adjacent staves of the array. By electrically connecting each group of 22 lines, the signals for 48 beams can be provided simultaneously, the 48 beams being centered at each of 48 points of the compass. Each of the 48 stave signal lines is connected to a preamplifier. The preamplifiers collectively are shown at 51, the output of each preamplifier being fed into the horizontal beam forming network 52. Since all of the 48 beam signals are simultaneously available at the 48 output terminals 53, the beam signals can be successively sampled at any high clock speed. After amplification in the 48 amplifiers 54 the 48 signals are applied to the 48 mixers 55. A locally generated injection frequency applied at 56 to the mixers is selected to produce a mixer product, in one embodiment, of 27 kc. Sufficient amplification is added in amplifiers 57 to carry the sonar signals through the many filters and the logic circuits following.

According to an important feature of this invention, novel means are provided here for identifying the Doppler shift of each detected target signal, which yields directly the rate of change or range, or simply "range rate." If there is no relative motion of the transducer array and the target, the transmitted and received frequencies will be the same, that is the Doppler shift is zero. If, however, the range is increasing while the target is being tracked the frequency received will decrease. This is termed negative or opening Doppler. The converse is true if the target is approaching in which case the Doppler is said to be positive or closing. According to this invention, each received beam signal is applied to a plurality of filters. The filters are of the bandpass type and are responsive, respectively, to contiguous segments or bands within the frequency range expected to be received. The expected frequency range is the transmitted frequency (5 kc., for example) plus and minus the maximum Doppler shift. Since pulses of different lengths and different bandwidths are transmitted, groups of filters of different passbands are employed. At 60, in FIG. 5, is shown three groups of Doppler filters. Where the transmitted pulse is long such as 120 microseconds, and as shown at C, in FIG. 4 with the narrow passband (8.3 c/s), as shown at $c$, a large number of narrow bandpass filters must be employed. In the particular embodiment illustrated, 32 Doppler filters 61 are switched in when the 120 millisecond pulse is being received. These filters 61, respectively, pass contiguous bands 10 cycles per second wide. When, however, the 30 millisecond pulses, B, are transmitted, the bandpass of the filters must be about 40 cycles per second. For this purpose 8 Doppler filters 62 are employed. If the pulses are 2 milliseconds long, where the spectral distribution is about 500 cycles wide, no Doppler information can be effectively determined and a single 800 cycle wide bandpass filter 63 is sufficient. Relay switches 66 are employed to selectively connect the 32-element filter 61 or the 8-element filter 62 or the single element filter 63 to the output terminals of the amplifiers 57. The switch relays 66 are selectively operated by the pulse length selector 20 which, as stated, selects the transmitted pulses of different lengths. In the case of pulses 2 milliseconds long, little Doppler information is obtainable and the output of filter 63 at terminals 67 is applied in directly to the computer to show the operator details of the acquired target, but without Doppler information. It is, of course, desirable to obtain the Doppler information for each of the 48 sonar signals. The sampling switch network 66A is preferably electronic, rather than electromechanical, and is so designed as to serve the purpose of a 32-pole 48-position switch assembly for connecting each of the 48 beams one set for each to each of the filter outputs 67. Control circuit 66B selects the beam to be tested. To that end, control circuit 66B must control the operation of sampling switch 66A, as well as the 48 signal circuits ahead of the relays 66.

Each of the Doppler output voltages is sampled in rapid succession to determine which, if any, of the 32 Doppler filters 61 or of the 8 Doppler filters 62 produces a signal voltage above a preselected threshold voltage. Then it is necessary merely to identify the particular filter which produced the voltage.

Let it be assumed that the output of the filter of the highest bandpass frequency will be sampled first. The filter output voltage is applied to the comparator 73 through the switch mechanism 74. In comparator 73, the Doppler voltage is compared with a threshold voltage standing in the storage or memory circut 72. The threshold voltage is determined by the computer 15 of the system, from information concerning the density of proceeding sonar signals. Where the computer is digital, and comparisons of analog voltages are made in comparator 73, digital-to-analog converter 77 must be employed as shown. If the sampled voltage does not exceed the threshold voltage an output occurs at the comparator which is applied to the counter 75. The counter 75 is then stimulated to operate the next switch 74 to connect the next filter output to the comparator. In the embodiment shown the filter outputs are sampled one after another until a voltage is found which exceeds the threshold voltage. Thereupon the comparator output, which is of negative polarity in the assumed case, interrupts the counter 75 and the sampling operations are stopped. The number of the counter output lead 75A then indicates the filter on which the signal voltage occurred.

The switch 74 may be of many types. The particular switch shown comprises a transistor 74A for grounding or ungrounding the signal line from the filter output to the comparator. Transistor 74 is of the PNP type and is normally conducting to short to ground the signal line. A positive pulse is required on the base of the transistor to interrupt conduction. Positive pulses are successively generated on the 32 output leads 75A of the counter 75. Signals from the comparator enable the output leads in succession. The switch 74 structure is repeated in the outputs of the 32 filters, each switch being operated by a different counter lead.

The maximum signal at the filters is converted to digital information in the analog-to-digital converter 76. Such a converter may assume any of many well known configurations in the digital voltmeter art. The output of the converter 76, containing a binary number indicative of the analog voltage of the maximum signal received, is adapted for storage in any digital computer.

The computer shown at 15 may be of any general purpose digital type of sufficient speed and capacity. Particular computers found to be satisfactory in the system of this invention are known commercially and in the military as the UYK–1 or the USQ–20 or the 1218 computers have high parallel storage capacity with rapid memory access and are programmed to receive the universal word format adopted by the NATO signatories for digital information transmission.

Significantly, the computer accepts and stores the digital information from the analog-to-digital converter 76 and at the same time supplies threshold level information through the digital-to-analog converter 77 so that the threshold voltage appearing at output of the memory or holding circuit 72 stands at the reference comparator input as a result of the stored digital information in the computer. It then becomes simple to increase or decrease the threshold of value of the voltage at 72 output as well. In this way the threshold voltage is raised or lowered by computations within the computer based upon the operational threat and the processing load. By means, not shown, the computer may transmit, once per ping, the threshold information to the sonar signal processing circuits where it is stored.

Through the computer input interface logic networks of 78, in addition to the amplitude information fed from converter 76 and 76A, the computer receives true beam number, range, and Doppler information. The beam number, which can be translated directly into true bearing information, is received from the beam selector 66B, FIG. 5. The range information is derived from the counter 80, FIG. 5, which accumulates the time between the end of the transmitted pulse and the received echo signal.

Clock-controlled synchronizing and control circuits for integrating the major and minor sequences throughout this system of FIGS. 5 and 6 are not described. The contents of the computer 15 are continuously transmitted to the sonar detection display 16, FIG. 1 and all of the target signals which have exceeded the threshold established by the computer and/or the operator are displayed symbolically on the display screen. In case of malfunction of the computer, the signals processed by the sonar signal processor 14 may be fed directly to the sonor detection display 16 through the scan converter 18. In this mode of operation the sonar detection display receives analog signals only from the scan converter. The operator at the screen of the sonar detector display 16 views the full 360° field and has displayed data on the entire set of above-threshold target signals. In case one sector of the field must be more closely examined, that field can be amplified upon the screen of the high resolution display 17. The high resolution display shows a range versus bearing scan presented on the face of a cathode ray tube. The display shows a selected 15° sector of the surveillance area centered on one of the 48 beams and a range segment in that sector of different numbers of yards such as, for example, 2,000, 1,000, 500 or 250 yards centered on the predicted range position of the target as determined by the computer or by the operator of the sonar detection display. Successive individual sectors may be selected by 16 and 15 and displayed sequentialy upon demand of the operator at display 17. The sectors to be examined are selected by the operator at display 16. The positioning data are kept by the computer on a sequential list in the order of selection by the operator at display 16 and are released to the high resolution display 17 in the same order upon demand.

The sonar displays of this invention ideally combine the speed and memory capacity of a digital computer with the human judgment of two operators. The defensive and offensive capabilities of the system of this invention in times of high speed submarines in antisubmarine warfare become obvious. The sonar system can "see" in all directions in the volume around and below ownship and yet can focus attention accurately upon any selected target area and can derive reliable classification and fire control information from that area. Doppler is reliably derived by the system of Doppler filters to accurately determine motion of possible enemy targets and supplies such information on any one of 48 beams or discreet azimuthal directions from the transducer array.

Obviously many modifications and variations of the present invention are possible in the light of the above teachings. It is therefore to be understood that within the scope of the appended claims the invention may be practiced otherwise than as specifically described.

What is claimed is:

1. In a sonar system, means for transmitting selected pulses of different lengths of high frequency energy, each pulse length having a characteristic spectral distribution,
    means for controlling the lengths of said pulses,
    means for receiving echo signals with the spectral distributions determined by the lengths of said pulses,
    means for determining the Doppler frequency of received signals, and the corresponding target range rate, said means comprising a first set of parallel connected bandpass filters resonant each to the center frequency of adjacent discreet bands of received frequency of the bandwidth corresponding to the spectrum of a first pulse length, and
    a second set of parallel connected bandpass filters, said second set of filters being resonant respectively to the center frequency of adjacent discrete bands of received frequency of the bandwidth corresponding to the spectrum of a second length pulse,
    switch means for selectively connecting either said first set or said second set of filters to the receiving means, and
    interlocking means between the pulse-length controlling means and the switch means.

2. In a sonar system, a transmitter for radiating pulses of a predetermined frequency,
    switch means for selecting the duration of pulses,
    means for receiving sonar echo pulse signals of said predetermined center frequency plus or minus Doppler shift frequencies above and below the center frequency,
    said system including, a first bank of bandpass filters, each filter having a predetermined bandwidth, each filter pass band corresponding, respectively, to different adjacent segments of the band of said frequencies to be received,
    a second bank of bandpass filters, the filters of said second bank each having a second predetermined bandwidth and being resonant, respectively, to different adjacent segments of the band of said frequencies to be received,
    switch means for selectively connecting either bank of filters to the sonar receiving means,
    and interlocking means for operating said filter selecting switch means in unison with the pulse-duration switch means.

3. In combination in a sonar system, an array of discreet transducer elements for transmitting and receiving sound waves in water to and from a target,
    a sonar receiver,
    means for combining the signals of a predetermined number of said elements for directionalizing the gain of said array to obtain a beam with selected directions,
    means for combining the signals of different groups of elements for changing the direction of said gain,
    means responsive to said sonar receiver for measuring the Doppler frequency and the target range rate,
    means for measuring the transmission time of each target signal to quantitize target range, and
    means for identifying the direction of each beam containing a target signal to quantitize the target azimuthal information,
    an analog-to-digital converter means for converting the signals representative of range rate and target signal strength to digital information,
    a general purpose digital computer with digital storage means coupled to said converter, and
    a sonar detection display for receiving stored computer information for displaying range, azimuth and range rate.

4. In a sonar system,
    a transducer array,
    a transmitter for energizing said transducer with a series of pulses,
    means for changing the duration of said pulses,
    a receiving system for detecting all echo signals, a plurality of groups of bandpass filters with adjacent pass bands for measuring the Doppler shift in transmitter frequency indicative of the target range rate, one group of filters having relatively narrow bandpass characteristics to receive and pass pulses of relatively long duration, and a second group of filters having relatively broader bandpass characteristics to pass pulse signals of relatively short pulse duration, switch means for selectively applying the output of said receiver to one or the other of said groups, and interlock means for interlocking said switch means with said pulse duration changing means of said transmitter.

5. The sonar system defined in claim 4 further comprising, a network for identifying the filter with the maximum voltage output, said network comprising a comparator, a voltage storing means, a switch means, and a counter for successively connecting the signal voltage output of each filter to said comparator for successively comparing each filter output with the voltage of said storage means, said counter for operating said switch means being responsive to the output of said comparator.

6. In combination, a transducer array including a plurality of discrete transducing elements for transmitting sound waves to and receiving sound waves from reflective objects, means for combining in the proper phase the signals of predetermined groups of said elements for increasing the gain of said array in, respectively, each of a predetermined number of discrete directions to form diverging beams, switch means for selecting in succession different beams, a beam selector means for operating said switch means with means for identifying each beam number in terms of azimuthal direction of the beam, a threshold voltage storage means, means responsive to received target signals, for changing said threshold voltage, means for comparing the amplitude of each target signal with the threshold voltage of said storage means, means for measuring the Doppler frequency of each beam signal to quantitize range rate, means for measuring transmission time of each target signal to quantitize target range, and means to, respectively, store direction information, range information and range rate information.

References Cited

UNITED STATES PATENTS

| | | | |
|---|---|---|---|
| 2,433,385 | 12/1947 | Miller | 340—3 |
| 3,005,194 | 10/1961 | Goodell et al. | 343—9Y |
| 3,098,210 | 7/1963 | Sparling et al. | 340—3 |
| 3,121,856 | 2/1964 | Finney | 340—3 |
| 3,129,402 | 4/1964 | Henne | 340—6X |
| 3,178,680 | 4/1965 | Jackson et al. | 340—6 |

RICHARD A. FARLEY, Primary Examiner

U.S. Cl. X.R.

343—9